(12) United States Patent
Thompson

(10) Patent No.: US 6,684,649 B1
(45) Date of Patent: Feb. 3, 2004

(54) ENTHALPY PUMP

(76) Inventor: David A. Thompson, 7709 W. Q Ave., Kalamazoo, MI (US) 49009

( * ) Notice: Subject to any disclaimer, the term of this patent is extended or adjusted under 35 U.S.C. 154(b) by 0 days.

(21) Appl. No.: 10/048,797

(22) PCT Filed: Feb. 4, 2000

(86) PCT No.: PCT/US00/02956
§ 371 (c)(1),
(2), (4) Date: Jan. 31, 2002

(87) PCT Pub. No.: WO01/35039
PCT Pub. Date: May 17, 2001

Related U.S. Application Data
(60) Provisional application No. 60/163,731, filed on Nov. 5, 1999.

(51) Int. Cl.[7] .......................... F25D 17/06; F25D 21/00
(52) U.S. Cl. .............................................. 62/93; 62/272
(58) Field of Search ............................. 62/93, 94, 271, 62/272

(56) References Cited

U.S. PATENT DOCUMENTS

| | | | |
|---|---|---|---|
| 2,946,201 A | * 7/1960 | Munters | 62/94 |
| 3,144,901 A | * 8/1964 | Meek | 165/6 |
| 4,180,985 A | 1/1980 | Northrup, Jr. | |
| 4,259,849 A | 4/1981 | Griffiths | |
| 4,700,550 A | 10/1987 | Rhodes | |
| 4,930,322 A | 6/1990 | Ashley et al. | |
| 4,939,906 A | 7/1990 | Spatz et al. | |
| 5,353,606 A | 10/1994 | Yoho et al. | |
| 5,373,704 A | 12/1994 | McFadden | |
| 5,502,975 A | 4/1996 | Brickley et al. | |
| 5,632,954 A | 5/1997 | Coellner et al. | |
| 5,653,115 A | 8/1997 | Brickley et al. | |
| 5,661,983 A | 9/1997 | Groten et al. | |
| 5,732,562 A | 3/1998 | Moratalla | |
| 5,826,641 A | 10/1998 | Bierwirth et al. | |
| 5,908,799 A | 6/1999 | Kobayashi et al. | |
| 5,931,016 A | 8/1999 | Yoho, Sr. | |
| 5,950,447 A | 9/1999 | Maeda et al. | |

FOREIGN PATENT DOCUMENTS

EP   0 992 470   4/2000

OTHER PUBLICATIONS

Patent Abstracts of Japan, JP 9–048668, Feb. 18, 1997.

* cited by examiner

*Primary Examiner*—Melvin Jones
(74) *Attorney, Agent, or Firm*—McGarry Bair PC (57) ABSTRACT

An enthalpy pump (10) for altering the humidity level of an air stream (12, 14). The enthalpy pump comprises a container having a transfer portion (38) disposed in a first air stream (12), with a liquid desiccant contained in the transfer portion (38). The transer portion (38) is permeable to water vapor and impermeable to the liquid desiccant to thereby retain the liquid desiccant within the container while permitting exposure of the liquid desiccant to the first air steam. The transfer portion (38) is also adapted to move the liquid desiccant into and out of the first air stream whereby the latent and/or sensible energy of the first air stream can be altered.

37 Claims, 7 Drawing Sheets

ENTHALPY PUMP

CROSS-REFERENCE TO RELATED APPLICATION

This application claims the benefit of International Patent Application No. PCT/US00/02956, filed Feb. 4, 2000, which claims the benefit of U.S. Provisional Patent Application No. 60/163,731 filed Nov. 5, 1999.

BACKGROUND OF THE INVENTION

1. Field of the Invention

The present invention generally relates to heating, ventilation, and air conditioning (HVAC) systems; and, more specifically, to HVAC systems that transfer sensible and/or latent energy between air streams, and humidify or dehumidify an air stream.

2. Description of the Related Art

Contemporary HVAC systems typically include high levels of ventilation and a means to recover sensible and sometimes latent energy from the exhaust air stream. Generally, energy recovery systems operate to extract heat (sensible energy) and moisture (latent energy) from one air stream and add the heat and moisture to the other air stream. For example, heat and humidity might be extracted from external air at a relatively high temperature and humidity combination, as may occur during the summer, or heat and humidity might be added to external air at a relatively low temperature and humidity combination, as may occur during the winter. The appropriate addition and removal of temperature and humidity from or to the external air not only increases comfort, but it reduces overall energy requirements for conditioning the incoming external air.

Known energy recovery systems began with plate heat exchangers, heat pipes, and sensible heat wheels. These systems were the first devices utilized to transfer sensible energy from one air stream to a second air stream. Later, the use of desiccants improved the performance of the wheel systems. In the heat wheel systems, desiccants are applied to the heat transfer surfaces enabling the transfer of both sensible and latent energy from a first air stream to a second air stream. Other known energy recovery /humidity control systems use liquid desiccants pumped from a packed bed in one air stream to a second packed bed in a second air stream to enable the transfer of latent and sometimes sensible energy from the first air stream to the second air stream.

The plate heat exchanger, as well as the heat pipe, are simple and, like common heating and air conditioning systems, almost never require maintenance over their typical 20-year life span. However, these devices do not transfer latent energy and thus have lost favor in the market. Heat wheels on the other hand, do transfer latent energy but are known to require considerable maintenance. Heat wheels experience failures of drive belts, bearings, gear drives, seals, collapse of structural members, and desiccant coating damage which includes chipping, flaking, and permanent clogging due to adsorbed contaminates. Additionally, the heat wheel's air passageways are exceptionally small and clog quickly if the heat wheel's air filtration system is not meticulously maintained. The desiccant coatings of the heat wheel, if they remain in place without damage, degrade in efficiency over time, as all desiccants do, but cannot be replaced. In four to six years most desiccant coated heat wheels must be replaced due to worn out mechanical parts and/or damaged or noneffective desiccant coatings. For these reasons the market has desired another device that can transfer both sensible and latent energy but one that does not have the operational problems and short life of a wheel.

Known liquid desiccant energy recovery or dehumidification systems using packed beds are typically employed only in heavy industrial applications due to their large size, initial capital cost, and high maintenance cost. Liquid desiccant systems are used in manufacturing processes due to their ability to dry air below the levels possible with other systems. Packed beds is a method to bring the liquid desiccant in direct contact with the air stream utilizing a large amount of surface area in a relatively small space. Liquid desiccant migrates to downstream areas of the system and because most liquid desiccants are very corrosive, they can cause considerable damage to downstream components of the system. In an attempt to avoid this in large part, liquid desiccant systems move air at very slow speeds or in complicated paths, giving rise to their large size. Liquid desiccant systems use components made from non-corrosive materials, which along with their large size gives rise to their high cost. Packed bed media must be replaced periodically because accumulated debris degrades effectiveness over time. Packed beds also require periodic cleaning and changing of the liquid desiccant as they act much like air washers and accumulate the debris.

A newer energy recovery system includes the use of solid desiccants that are adhered to opposing sides of a structure that is exposed to different air streams on each of its two sides. The sensible and latent energy is transferred from the desiccant material on one side, to the supporting material, then to the desiccant on the opposing side, and is released then to the second air stream. U.S. Pat. No. 5,653,115 is illustrative of such a solid desiccant approach.

Known humidification and dehumidification methods and devices can be combined with the previously described energy recovery systems as needed. Known humidification systems use packed beds to evaporate water into the air stream or use energy to heat water and then inject it as steam into the air stream. Packed beds with standing water have been identified as a source of indoor air contaminates with the growth of mold, spores and bacteria. Steam humidification equipment is expensive and uses a lot of energy to operate. Neither system is well suited for inclusion in roof mounted HVAC equipment as they deal with pure water that needs winter protection from freezing.

Known dehumidification systems use heat regenerated desiccant-coated wheels or super cool the air to condense the moisture out using vapor compression or chilled water components. Equipment that cools the air uses large amounts of energy to operate and are quite expensive to purchase and install. Equipment that uses desiccant-coated wheels have all the disadvantages of the coated wheel as described above and uses large amounts of energy to heat the desiccant in the regeneration process.

SUMMARY OF THE INVENTION

The invention relates to an enthalpy pump for altering the humidity levels of an air stream by exposing the air stream to a contained liquid desiccant. In one aspect, the enthalpy pump comprises a container having a transfer portion adapted to hold a liquid desiccant. The container comprises a conduit forming a circulation loop that will extend through a first air stream, and through a second air stream. The transfer portion is permeable to water vapor and impermeable to liquid desiccant so as to retain the liquid desiccant within the container while permitting exposure of the liquid desiccant to the air streams. The transfer portion includes a first portion to be located in the first air stream and a second portion to be located in the second air stream. The transfer portion is further adapted to move the liquid desiccant into and out of at least one of the streams whereby humidity in the air stream can be altered.

A second embodiment of the enthalpy pump further comprises a support, preferably in the form of a rotating wheel, for moving the container in and out of an air stream or between a first and a second air stream. Preferably, there are multiple blade-like containers extending from the center of the wheel radially outwardly and the wheel overlies at least a portion of first and second air streams, whereby the rotation of the wheel moves the liquid desiccant in the blade-like containers in and out of the first and second air streams.

In a third embodiment of the enthalpy pump, the container comprises a reservoir for storing a liquid desiccant and a conduit adapted to extend into the air stream, and the transfer portion is formed in the conduit.

Preferably, the transfer portion has openings sized between approximately 3 and 500 angstroms. The transfer portion is preferably made from one of PTFE, HDPE, PBA, PEN, and sintered plastics.

The enthalpy pump can have many alternative configurations. For example, the enthalpy pump can include multiple conduits, each of which extends into different air streams. A water supply can be fluidly connected to the enthalpy pump to add water and increase the concentration of the water in the liquid desiccant for increased humidification performance. Also, a water extractor can be added to the enthalpy pump to remove water from the liquid desiccant thereby decreasing the concentration of water in the liquid desiccant thereby increasing dehumidification performance. The different configurations are in part due to the many functional modes the enthalpy pump is capable of operating in. In multiple air stream systems it can operate as an enthalpy recovery system, an enthalpy recovery system with added humidification, an enthalpy recovery system with added dehumidification, a sensible recovery system, a sensible recovery system with humidification, a sensible recovery system with dehumidification, or a latent only recovery system. In a single air stream system it can operate as a humidifier system, or a dehumidifier system.

In all embodiments, means can be provided for additionally effecting sensible energy transfer to alter the temperature of an air stream.

DESCRIPTION OF THE PREFERRED EMBODIMENT

Figure 1:
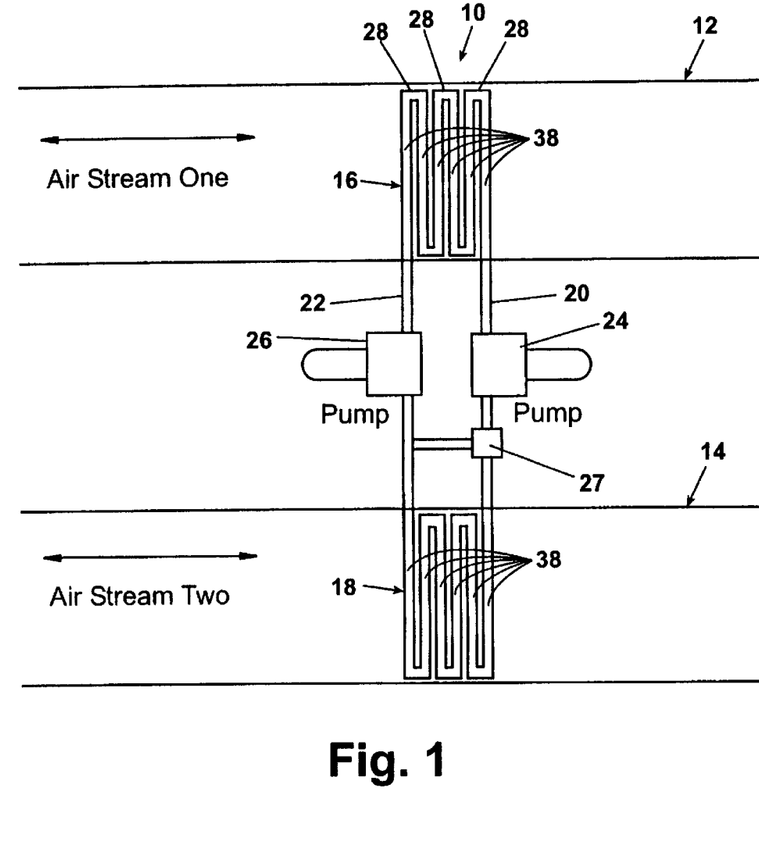
FIG. 1 is a diagrammatic view of an enthalpy pump according to the invention with multiple vapor permeable conduits arranged in coil assemblies and capable of functioning as an enthalpy recovery system, an enthalpy recovery system with added humidification, an enthalpy recovery system with added dehumidification, a sensible energy recovery system, a sensible recovery system with humidification, a sensible recovery system with dehumidification, or a latent only recovery system.

FIG. 1 illustrates an enthalpy pump 10 for adding or extracting temperature and/or humidity from air streams 12 and 14. In most applications of the enthalpy pump 10, the air streams 12 and 14 will correspond to external supply and the internal exhaust air of a building, respectively. However, the air streams 12 and 14 can also include other configurations, such as both being internal air streams within a building.

The term "enthalpy pump" is sometimes used in the art to describe systems that transfer both latent (moisture) and sensible (heat) energy from one air stream to another air stream. For purposes of this description, the term "enthalpy pump" refers to a device capable of allowing either or both latent and sensible energy in an air stream, with or without a transfer of energy relative to another air stream.

Figure 2:
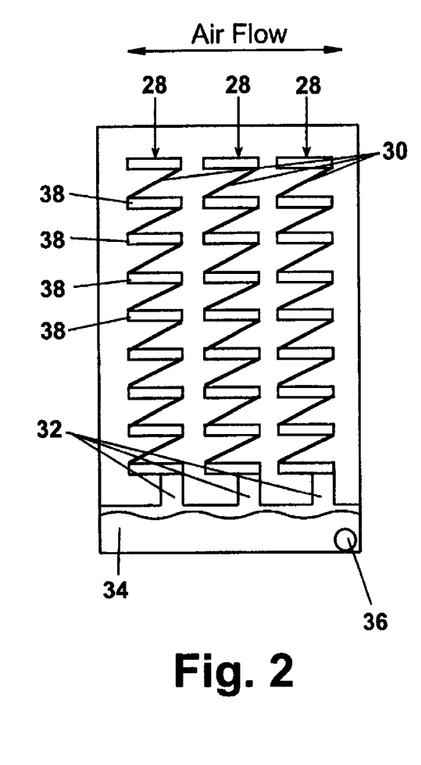
FIG. 2 is an end view of one of the desiccant coil assemblies of the embodiment of the invention shown in FIG. 1.

Referring to FIGS. 1 and 2, the enthalpy pump 10 comprises a pair of coil assemblies 16, 18. The coil assemblies 16, 18 are fluidly connected by external conduits 20, 22. Fluid pumps 24, 26 are provided in-line with each of the external conduits 20, 22, and pump a liquid desiccant therethrough. Illustrative examples of suitable liquid desiccants include lithium chloride, lithium bromide, triethylene glycol, and ethylene glycol.

A control valve 27 is disposed in-line with the external conduit 20 and is fluidly connected to the external conduit 22. The control valve 27 is operable to control the flow of fluid through the external conduits 20, 22 and ultimately either through or around the coil assembly 18. The more fluid that is allowed by control valve 27 to bypass coil assembly 18, the more performance is reduced.

Referring to FIG. 2 specifically and FIG. 1 generally, each of the coil assemblies 16, 18 comprises multiple conduits 28 arranged in multiple vertically oriented columns defining a serpentine path, extending back and forth across the corresponding air stream. Each of the conduits 28 has an inlet 30 at its upper end and an outlet 32 at its lower end. The outlets 32 are fluidly connected to a tank or reservoir 34, which is fluidly coupled to the corresponding pump by a tank outlet 36. The external conduit 22 fluidly connects the inlets 30 and the external conduit 20 fluidly connects the outlets 36 to complete the fluid loop.

The conduits 28 have a transfer portion 38 that is vapor permeable and liquid impermeable. The transfer portion 38 of the conduits 28 has openings that are of a size to permit water vapor molecules to pass through but are small enough to contain the liquid, preferably liquid desiccant. The openings can be formed in the transfer portion 38 or can be defined by the molecular structure of the material comprising the transfer portion 38. Suitable materials for the transfer portion 38 include Gore-Tex, which is stretched polytetrafluoroethylene (PTFE), sold by W. L. Gore, Tyvek, which is a spun bonded, point or area, high-density polyethylene (HDPE) sold by DuPont, Porous Poly (HDPE), Pebax which is a non plasticized flexible polyamide made from polyether block amides (PBA), polyethylene naphthalate (PEN), and sintered plastics.

Preferably, the transfer portion opening size is greater than the average water vapor molecule size. Given that the average water vapor molecule is approximately 2.8 angstroms, the openings in the transfer portion 38 are preferably larger than about 3 angstroms so that the vapor can easily migrate through the transfer portion. On the other hand, the nature of liquid desiccants, including surface tension, etc., prevents migration of the liquid through pores smaller than about 500 angstroms. Thus, the preferred range for openings in the transfer portion 38 is 3–500 angstroms. With such an opening configuration, the humidity or water vapor contained in either of the air streams 12, 14, can contact the desiccant through the transfer portions 38 to permit either the adsorption of water vapor from the air into the desiccant or the desorption of water vapor from the desiccant to the air through the openings as the case may be, while containing the liquid desiccant within the transfer portions 38.

The transfer portion is preferably in the shape of a panel having a hollow interior. The panels are preferably about ¼ inch thick when made of Tyvek, but can be any thickness depending on the particular configuration and material used. The thickness edge of the transfer panel is preferably oriented toward the air flow direction to reduce interference with the air flow. The panels can be of many different widths and lengths. For example, the panels forming the transfer portion 38 in FIG. 2 are arranged in three columns, however, the length of the panels could be increased to have only one column of panels having the same surface area as the three columns of panels. Although not controlling for the invention, it is preferred for the liquid desiccant to flow in a direction opposite the airflow, which is why the leading edge of each panel is fluidly coupled to the trailing edge of the next panel. If desired, the entire conduit 28 can be made from the same material as the transfer portion 38, according to the structural requirements of the system.

There are several modes of operation for the enthalpy pump of the invention. The pump can have one or multiple coil assemblies used in one or multiple air streams. The air streams can be common or separate. For simplicity of description, the operation of the invention will be described in the context of two separate air streams and in an enthalpy recovery mode during the summer cooling season. In this example, it is presumed that the air stream 12 is a source of external (outdoor) air entering a building and the air stream 14 is a source of internal (return) air exiting a building.

During operation, the pumps 24, 26 circulate the liquid desiccant throughout the fluid loop defined by the coil assemblies 16, 18 and the connecting external conduits 20, 22. As the outdoor air is drawn through the coil assembly 16, the air contacts the surface of the transfer portion 38 and reacts with 1) the surface material temperature which in turn reacts with the liquid contained within through conduction impacting the air temperature, and 2) the liquid desiccant contained within through the openings in the transfer portion 38 impacting the humidity level in the air. Assuming that the outdoor air comprises a relatively high combination of temperature and moisture, the liquid desiccant will adsorb water vapor from the outdoor air through the transfer portion openings, and the surface material will conduct heat from the air and transfer it to the liquid. This operation reduces both the sensible and the latent energy of the air stream. The resulting supply air exiting the coil assembly 16 has a lower humidity and temperature than the outdoor air that entered coil 16.

The lower temperature and lower humidity air in a building is typically vented (returned) as an air stream 14 where it must pass through the second coil assembly 18. As the return air at a lower temperature and lower humidity passes through the second coil assembly 18, water vapor adsorbed by the liquid desiccant in coil assembly 16 is desorbed to the return air stream through the openings in the transfer portion 38. The return air is also raised in temperature as it passes through the coil assembly 18 by the surface material temperature that is raised by the liquid temperature that was raised in coil assembly 16. The warmed and humidified return air is exhausted to the atmosphere. To increase the transfer of humidity from the liquid desiccant to the exiting air stream, a heater can be supplied to increase the temperature of the liquid desiccant, which increases the rate of desorption. However, such a device is more likely to be utilized when the enthalpy pump is used in a single coil humidification or dehumidification mode.

It is worth noting that other typical HVAC components can be used to condition the desiccant of either coil assembly 16, 18 to more suitably permit the transfer of water vapor or temperature between the air stream and the liquid desiccant as desired. For example, it is possible to alter the temperature, pressure, or desiccant concentration, of the liquid desiccant to change its state to one more suited for either the adsorption or desorption of water vapor or for heating or cooling.

Figure 3:
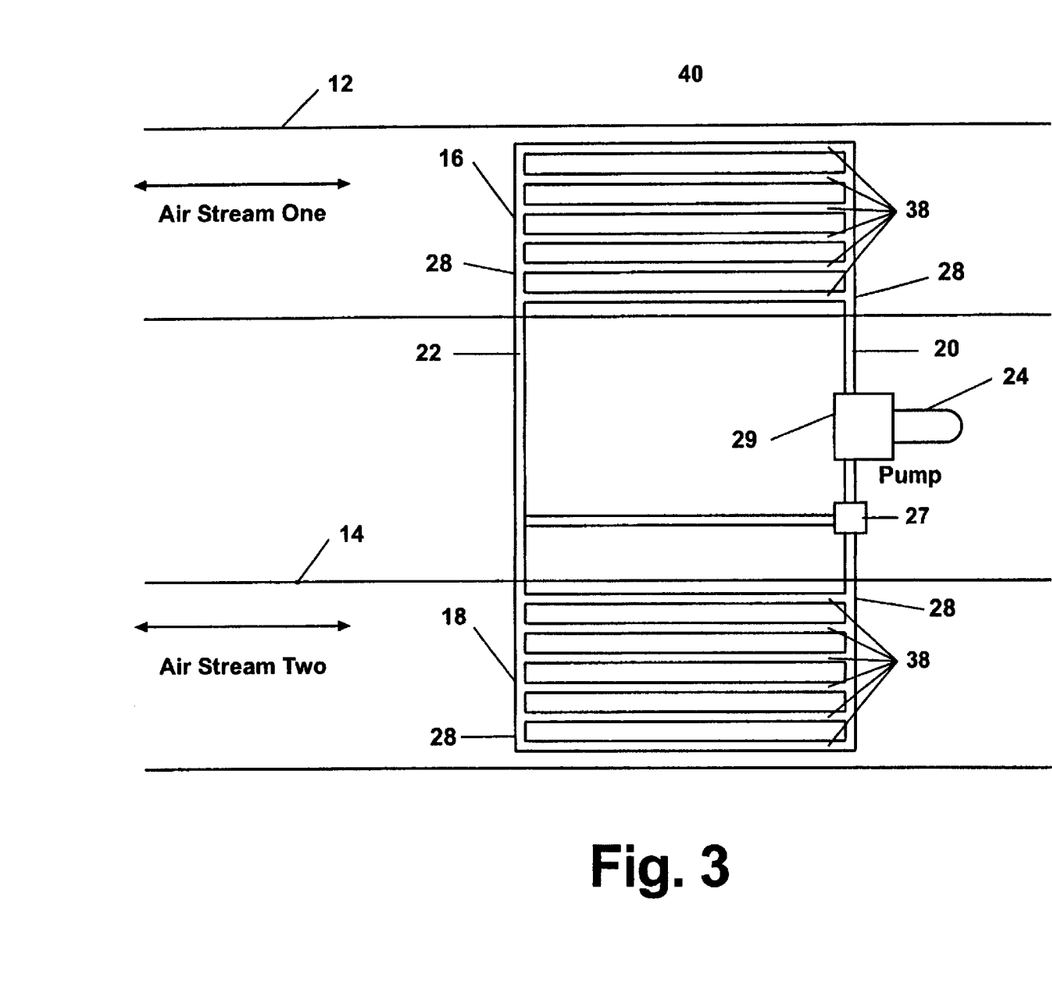
FIG. 3 is a second embodiment of an enthalpy pump according to the invention that uses only one pump and a single reservoir and is capable of functioning as an enthalpy recovery system, an enthalpy recovery system with added humidification, an enthalpy recovery system with added dehumidification, a sensible energy recovery system, a sensible recovery system with humidification, a sensible energy recovery system with dehumidification, or a latent only recovery system.
Figure 4:
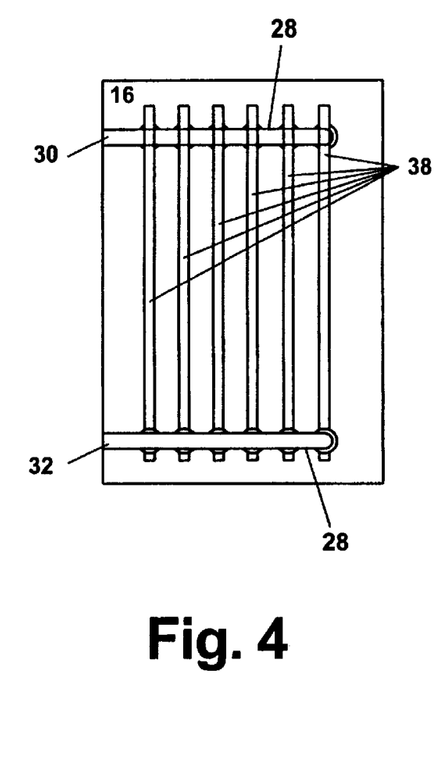
FIG. 4 is an end view of one of the desiccant coil assemblies used in the embodiment of the invention shown in FIG. 3.
Figure 5:
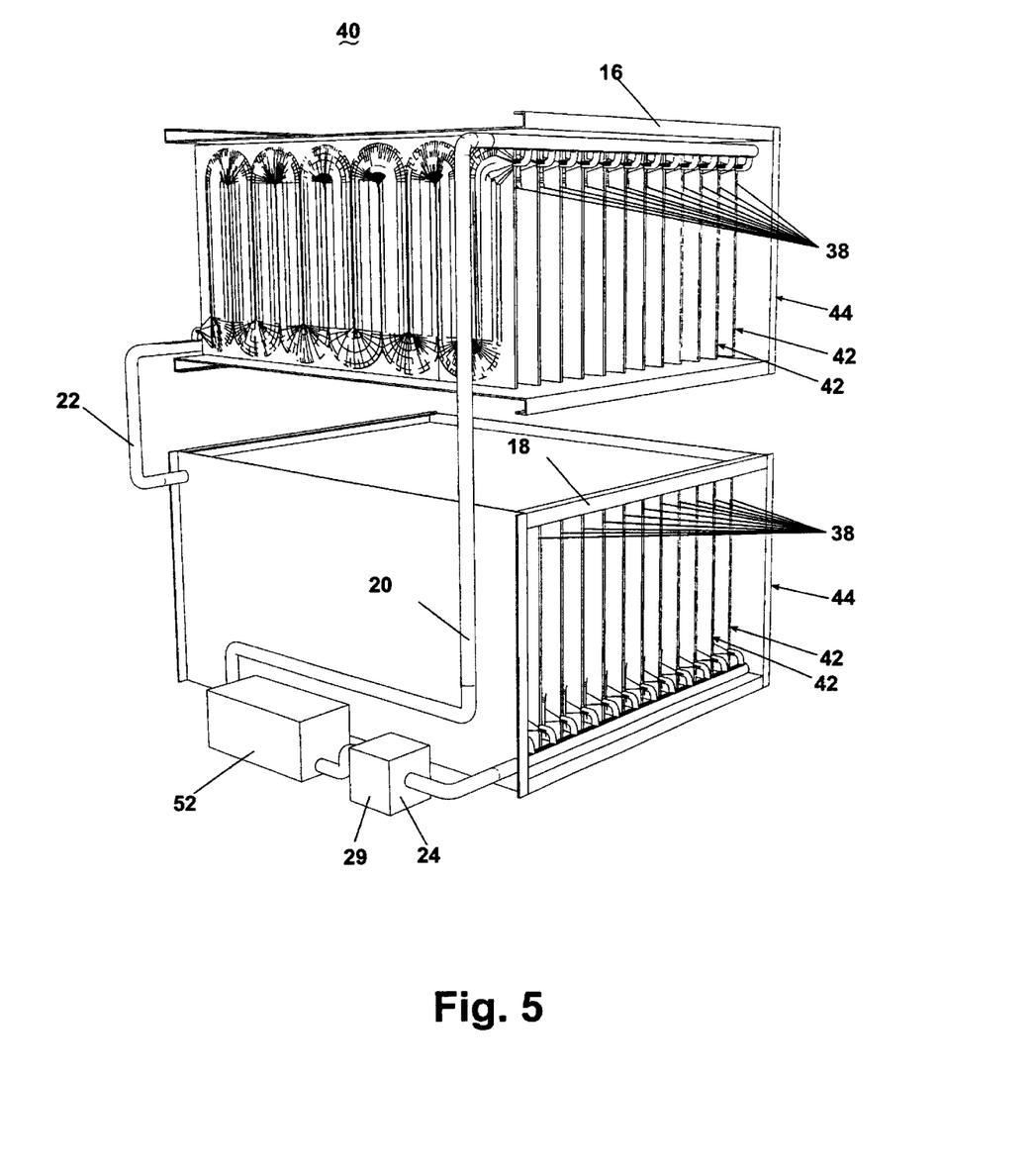
FIG. 5 is a perspective view of a specific implementation of the second embodiment of FIGS. 3 and 4 illustrating the coil assemblies with transfer portions in the form of multiple transfer panels.

FIGS. 3, 4, and 5 illustrate a second embodiment of the enthalpy pump 40 according to the invention. The second embodiment 40 is similar in many respects to the first embodiment 10. Therefore, like numerals will be used to identify like parts and only the differences between the first and second embodiments will be described for the sake of brevity. The principal difference between the second and first embodiments is that the second embodiment only uses a single pump 24 instead of multiple pumps 24, 26 and the transfer portions 38 are vertical full cabinet panels instead of small horizontal panels. Reservoir 29 is contained within the pump 24, instead of the base of coil assembly 16,18 as in the first embodiment. The single pump structure also requires different locations of the inlets 30 and outlets 32 for the coil assemblies 16, 18 in keeping with the linking of the vertical panel inlets and outlets. The vertical panels in some cases can provide more transfer surface area than the horizontal panels of embodiment 10, which increases the sensible and latent transfer performance of the enthalpy pump.

FIG. 5 is a specific implementation of the second embodiment enthalpy pump. In the specific implementation, the coil assemblies 16 and 18 comprise multiple vertically oriented panels 42 mounted to a housing 44, which is disposed within the corresponding air stream 12 or 14, which is typically defined by a duct system.

The panels 42 are preferably made from opposing sheets of Tyvek and have a thickness of approximately ¼ inch, although the thickness can vary depending on the material and the requirements of the particular implementation. Regardless of the actual dimensions, the panels 42 will have a relatively large surface area that is parallel to the air flow and a relatively small surface perpendicular to the air flow. The large surface area parallel to the air flow, promotes the adsorption of water vapor from the air stream to the liquid desiccant contained in the panels, while minimizing interference with the air flow. The relative large surface area has the added advantage of better transferring the sensible heat to and from the liquid desiccant, depending on the particular coil assembly 16, 18.

The combination of the panel surface area and the volume of liquid desiccant circulated through the panels yields sufficient heat exchange characteristics that sensible energy can be transferred between the air streams in addition to the latent energy transfer attributable to the adsorption and release of humidity to and from the desiccant. The transfer of both sensible and latent energy is very advantageous and permits the enthalpy pump of the invention to provide energy recovery benefits.

The specific implementation disclosed in FIG. 5 can also include one or more components 52 used to condition the desiccant to improve the adsorption or release characteristics of the liquid desiccant. For example, a heating element could be added to increase the temperature of the liquid desiccant, which increases the tendency of the liquid desiccant to release water and it can increase the transfer of sensible heat. A water supply/extractor can be added to increase/decrease the concentration of water in the liquid desiccant, which correspondingly decreases/increases the adsorption/release of water into the liquid desiccant. These components can be used in combination and are illustrative and not meant to be limiting.

Figure 6:
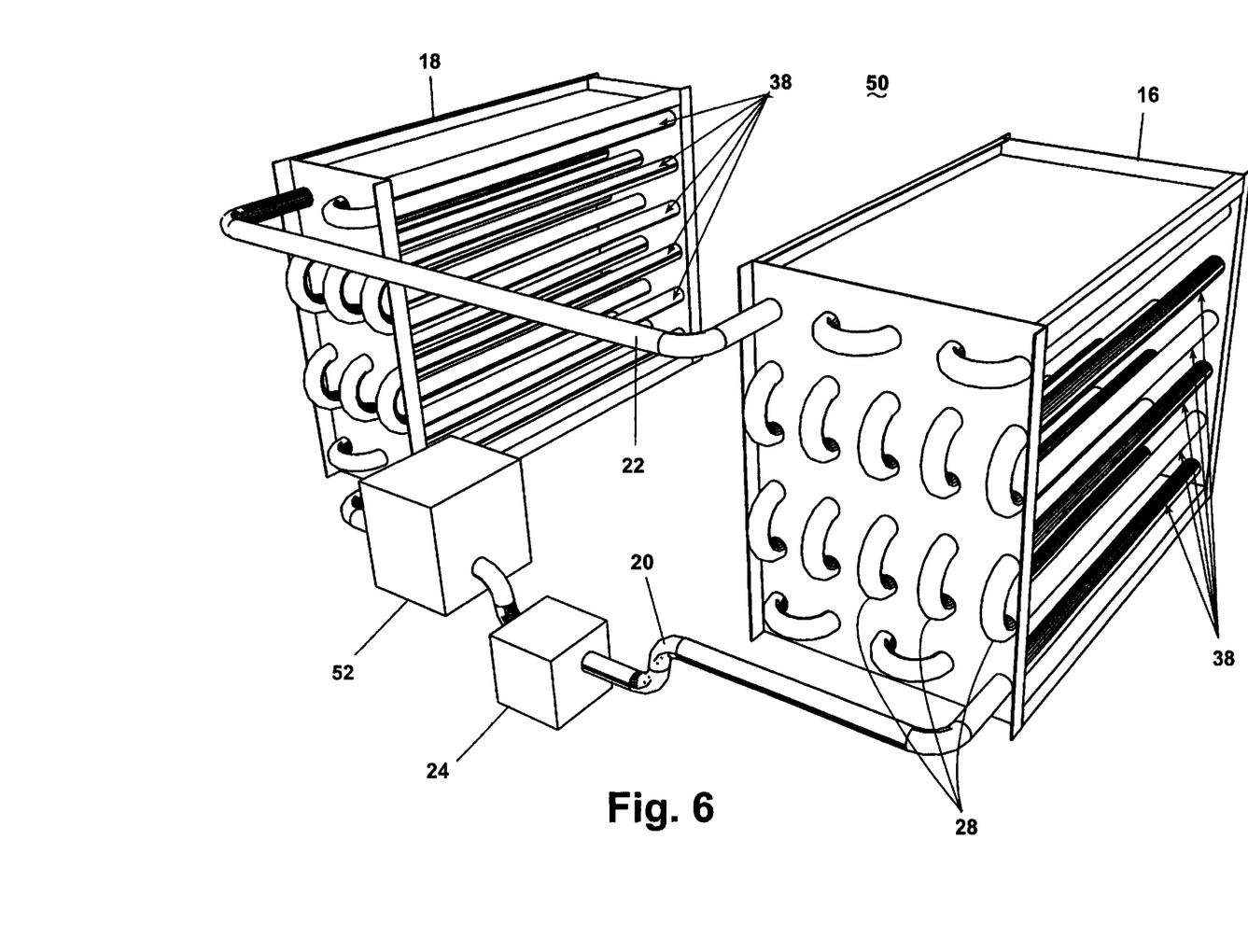
FIG. 6 is a perspective view of a third embodiment of an enthalpy pump according to the invention, and functioning as an enthalpy recovery system, an enthalpy recovery system with added humidification, an enthalpy recovery system with added dehumidification, a sensible energy recovery system, a sensible recovery system with humidification, a sensible recovery system with dehumidification, or a latent only recovery system.

FIG. 6 illustrates a third embodiment of the enthalpy pump 50 according to the invention. The third embodiment 50 is similar in many respects to the first and second embodiments. Therefore, like numerals will be used to identify like parts and only the distinctions between the embodiments will be described. The third embodiment 50 comprises a single pump 24 with internal reservoir 29 as does the second embodiment. Optional equipment 52 can be provided to raise or lower the temperature of the liquid desiccant to further condition it for improved sensible or latent transfer. The coils 16, 18 of the third embodiment are formed from tubes, instead of from panels, like the first and second embodiments. The tubes are arranged in vertically oriented conduits, with transversely extending transfer portions 38.

Figure 7:
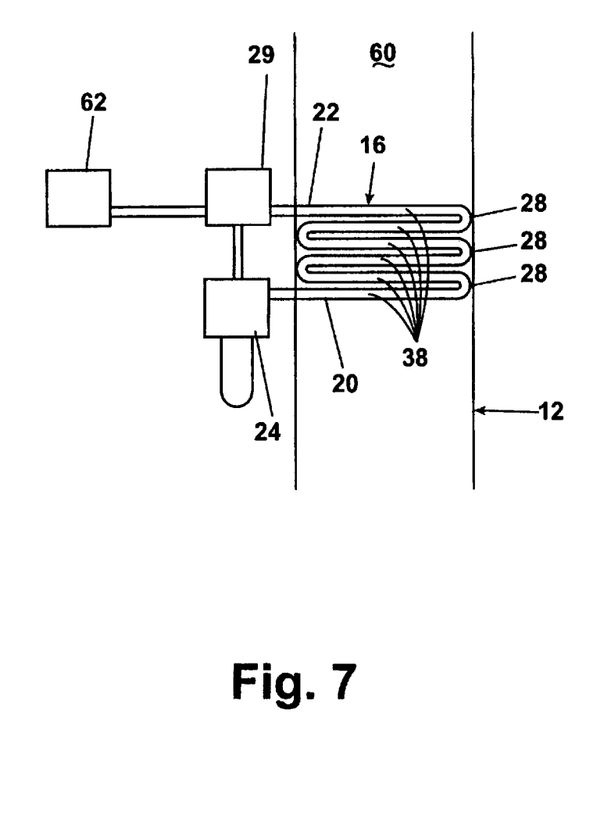
FIG. 7 is a diagrammatic view of a fourth embodiment of an enthalpy pump according to the invention having a single coil and functioning as a humidifier.

FIG. 7 illustrates a fourth embodiment of the enthalpy pump 60 according to the invention. The fourth embodiment 60 is similar in many respects to the previous embodiments, except that it only has a single coil 16 disposed within the air stream 12. The single coil 16 is fluidly connected to the pump 24 and reservoir 29 by conduits 20, 22, respectively. A water source 62 is fluidly connected to the reservoir 29 and provides a source of water to be added to the reservoir 29 to control the concentration of water in the liquid desiccant circulating through the enthalpy pump 60.

The water source 62 preferably includes a fluid control device, such as a float valve, that controls the amount of water supplied by the water source 62 to the reservoir. An empty float valve is used to control the introduction of water from the water source 62 to the reservoir 29. The float portion of the float valve is disposed within the reservoir 29 and moves up and down with the level of the liquid desiccant within the reservoir 29. If the float falls below a predetermined level, it opens a valve to permit the introduction of water from the water source 62 into the reservoir 29 until the float reaches the predetermined level and the valve is then turned off. The water source 62 with its attending float valve disposed in the system reservoir 29 can also be applied to embodiments one, two, and three to allow them to operate in the sensible energy recovery with humidification mode or the enthalpy recovery with added humidification mode.

The fourth embodiment is ideally suited for use as a humidifier. The water source 62 maintains the concentration of water in the liquid desiccant at a predetermined level that is sufficiently high enough to ensure the transfer of water vapor from the liquid desiccant into the air stream as the air stream passes over the transfer portion 38 of the coil 16. While all embodiments are targeted for the commercial and industrial markets, the fourth embodiment enthalpy pump operating as a humidifier is also ideally suited for residential use. This is especially true since there are relatively no moving parts, except for the float valve configuration, yielding a humidifier that has substantially low maintenance and repair requirements when compared to contemporary humidifiers. Additionally, the enthalpy pump 60 is also relatively quiet as compared to current humidifiers.

Figure 8:
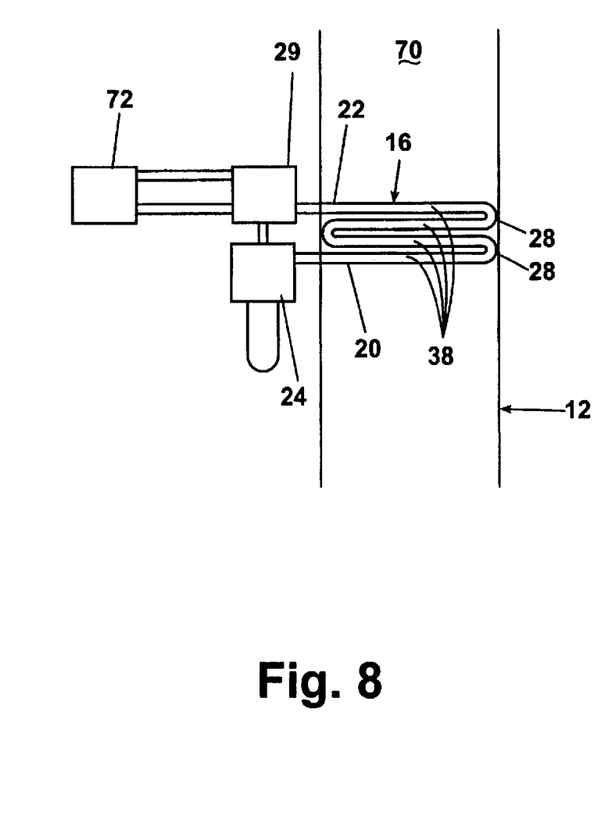
FIG. 8 is a diagrammatic view of a fifth embodiment of an enthalpy pump according to the invention having a single coil and functioning as a dehumidifier.

FIG. 8 illustrates a fifth embodiment of an enthalpy pump 70 according to the invention. The fifth embodiment enthalpy pump 70 comprises a coil 16 having multiple conduits 28 that are connected to a reservoir 29 and pump 24 by conduits 22, 20, respectively. A water extracting device 72 is fluidly connected to the reservoir 29 to extract water from the liquid desiccant.

The water extraction device 72 can be any device suitable for extracting water from a liquid desiccant. Examples of suitable water extraction devices include a centrifuge, a sieve, an osmosis filter, and a pressure chamber. For the invention, it is only important that the water extraction device 72 be capable of removing water from the liquid desiccant, without substantially reducing the quantity of the liquid desiccant.

Like the water supply 62 of the fourth embodiment, the water extraction device 72 can include a float valve positioned within the reservoir 29 to monitor the level of the liquid desiccant. Once the level of the liquid desiccant exceeds a predetermined amount, the float valve will fluidly connect the reservoir 29 to the water extraction device 72, which then extracts water from the liquid desiccant, returning the liquid desiccant to the reservoir 29, until the predetermined level is reached, resulting in the float valve shutting the flow of liquid desiccant to the water extraction device 72.

The fifth embodiment 70 is ideally suited for use as a dehumidifier in that the concentration of the water in the liquid desiccant is maintained at a predetermined level that encourages the transfer of water vapor from the air stream into the liquid desiccant, where it is removed by the water extraction device 72. The water extraction device 72 with attending float valve disposed in the system reservoir 29 can also be applied to embodiments one, two and three to allow them to operate in the sensible energy recovery with dehumidification mode or the enthalpy recovery with added dehumidification mode.

It is worth noting for any of the enthalpy pump embodiments that the location of the water source 62 and water extraction device 72 is shown as being fluidly connected to the reservoir 29. It is within the scope of the invention for the water source 62 and the fluid extraction device 72 to be fluidly connected to any portion of the recirculation system for the enthalpy pumps of any embodiment.

Figure 9:
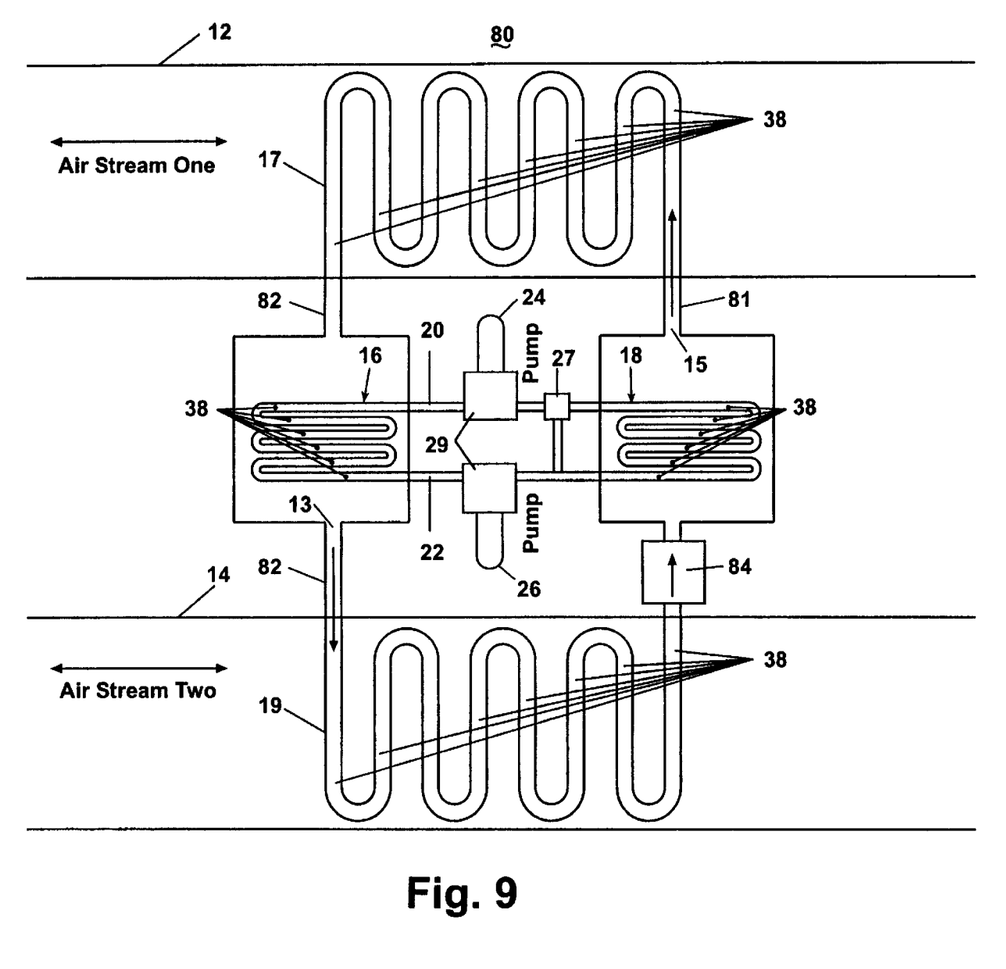
FIG. 9 is a diagrammatic view of a sixth embodiment of an enthalpy pump according to the invention using a two-stage configuration where the liquid desiccant is remote from the conditioned air. This embodiment can function as an energy recovery system if two coils are used or as a humidifier or dehumidifier if one coil is used.

FIG. 9 illustrates a sixth embodiment of the enthalpy pump according to the invention. Like parts in the sixth embodiment and the previous embodiments will be identified by like numerals. The sixth embodiment 80 is similar to the first embodiment except that it is a two-stage system. The two-stage system concept can be applied to any of the embodiments of this invention but is described here in the energy recovery embodiment. The two liquid desiccant coils 16 and 18 are disposed in air streams 13 and 15 respectively, defined by coils 17 and 19, which form an air circulation loop connecting the air streams 12 and 14. Air stream 13 enters coil 19 after passing through coil 16 and air stream 15 enters coil 17 after passing through coil 18. A fan 84 circulates air streams 13 and 15 through coils 17 and 19 respectively.

With this embodiment the coils in air streams 12 and 14 have only air inside them while the liquid desiccant coils 16 and 18 are remotely mounted from air streams 12 and 14. This two-stage concept first conditions secondary air streams (13 and 15) and these air streams in turn condition the process air streams 12 and 14. The liquid desiccant in the coils 16 and 18 does not actually pass into the process air streams 12 and 14. Only the conditioned air passing through the coils 16 and 18 are directed to the process air streams 12 and 14 through the coils 17 and 19. This two-stage concept may have advantages in certain applications with sensitive air streams or in certain building situations where air ducts are easier to construct than liquid lines.

The coils 17 and 19 are preferably of the same structure as the coils 16 and 18 in that they are formed of one or more conduits having a transfer portion. However, given that the coils 17 and 19 are not required to contain a liquid, they do not necessarily have to be made from a water vapor permeable and liquid desiccant impermeable material. It is within the scope of the invention for the coils 17 and 19 to be eliminated, with the coils 16 and 18 being fluidly connected to the air streams 12 and 14 with traditional duct work.

Figure 10:
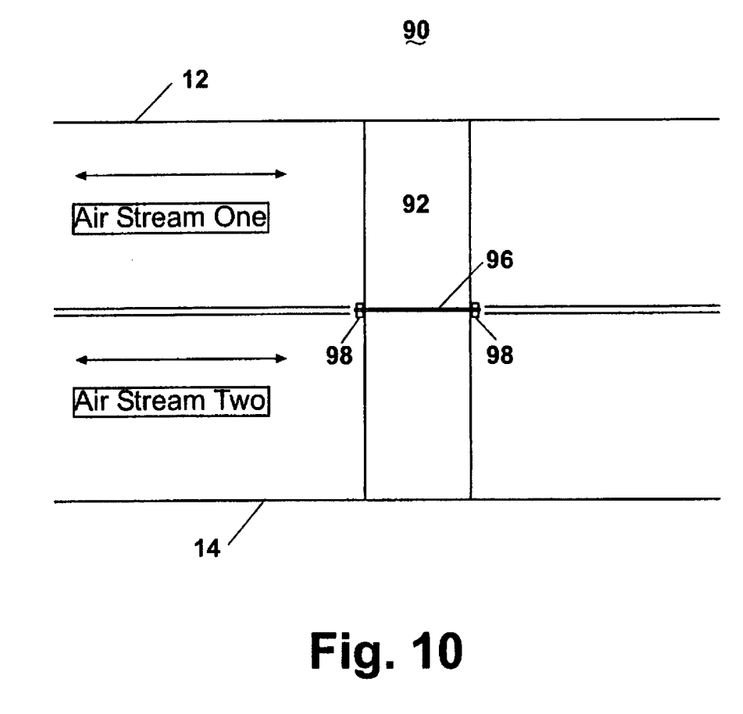
FIG. 10 is a diagrammatic view of a seventh embodiment of an enthalpy pump according to the invention having liquid desiccant filled panels arranged radially in a wheel fashion and functioning as an enthalpy recovery system, a sensible recovery system, or a latent recovery system.
Figure 11:
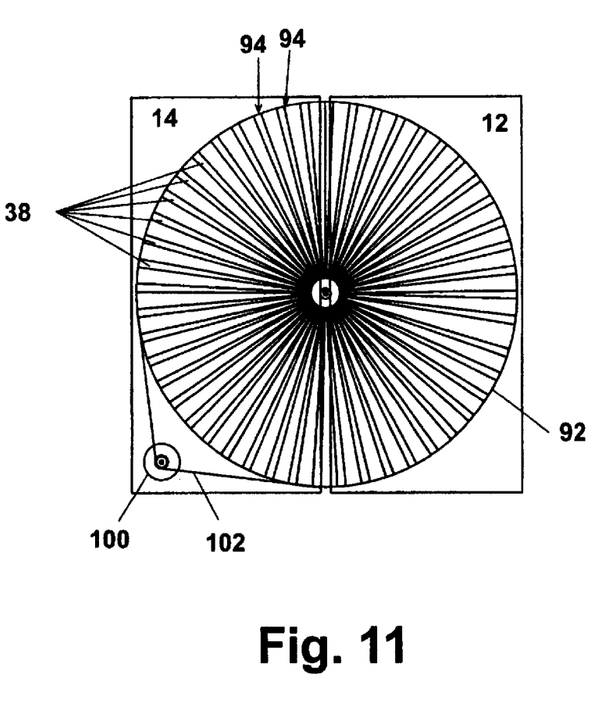
FIG. 11 is an end view of the liquid desiccant panel wheel assembly as used in the embodiment of the invention as shown in FIG. 10.

FIGS. 10 and 11 illustrate a seventh embodiment of the enthalpy pump according to the invention. Like parts in the seventh embodiment and the previous embodiments will be identified by like numerals. The seventh embodiment enthalpy pump 90 has a wheel-type configuration 92 comprising multiple blade-like panels 94, with a portion of the wheel 92 overlying each of the air streams 12 and 14. The panels 94 are similar to the second embodiment as the panels 94 are mostly transfer portion 38 that are vapor permeable and liquid impermeable and which have a relatively large surface area parallel to the air flow and a relatively small surface area perpendicular to the air flow. Each liquid desiccant filled panel has a drain and fill opening (not shown) to facilitate liquid desiccant renewal. The liquid desiccant filled panels are arranged blade-like radially around a center core that rotates on a shaft 96 supported by bearings 98 which together constitute the wheel assembly 92. Rotation is accomplished by motor 100 and drive belt 102.

The liquid desiccant filled panels 94 are sealed and do not have any flow of liquid desiccant into or out of them. The two air streams 12,14 are arranged so that they each flow through one half of the wheel assembly 11, either by a vertical or horizontal split. As wheel assembly 11 rotates, the liquid desiccant filled panels move between the two air streams. When in the warmer and more humid air stream they collect heat and humidity, and then give the heat and humidity to the colder air stream as they rotate through it.

Embodiment seven is different from the other embodiments in that it does not have a pump, a reservoir, or a liquid circulating system. Instead the liquid desiccant inside the panels 94 travel between air streams by rotation of the wheel assembly 11. Embodiment seven can operate as an enthalpy recovery system or a latent only transfer system. If the normally liquid desiccant filled panels are filled with water instead, embodiment seven can then operate as a sensible-only recovery system. If the normally liquid desiccant filled panels are filled with dry desiccant, or the panels contain only a very small amount of liquid desiccant, embodiment seven can operate as a latent-only recovery system.

The advantages of embodiment seven over known heat wheels, using dry desiccant, are substantial. For example, the desiccant (dry or liquid) is replaceable, extending the life of the wheel assembly significantly. Another advantage is that the desiccant cannot come loose and be carried away by the air stream. Further, the wheel can be cleaned without concern for damage to the desiccant. Still another advantage is that the bigger air stream passageways of the wheel assembly of the invention are not prone to clogging, minimizing the need for filters.

An enthalpy pump according to the invention has several advantages over prior enthalpy recovery, humidification and dehumidification systems. Most importantly, the invention provides a low cost and low maintenance system utilizing the performance benefits of a liquid desiccant without the disadvantages of prior systems that incorporated liquid desiccants. The benefits are accomplished by containing the liquid desiccant in a vapor permeable, liquid impermeable, container, preventing its migration into the air stream.

While the invention has been specifically described in connection with certain specific embodiments thereof, it is to be understood that this is by way of illustration and not of limitation, and the scope of the appended claims should be construed as broadly as the prior art will permit.

What is claimed is:

1. An enthalpy pump for altering the humidity level of an air stream, the pump comprising:

a container having a transfer portion adapted to hold a liquid desiccant, wherein the container comprises a conduit forming a circulation loop that will extend through a first air stream and through a second air stream, the transfer portion being permeable to water vapor and impermeable to liquid desiccant so as to retain the liquid desiccant within the container while permitting exposure of the liquid desiccant to the air streams, wherein the transfer portion includes a first portion to be located in the first air stream and a second portion to be located in the second air stream, the transfer portion further being adapted to move liquid desiccant into and out of at least one of the air streams whereby humidity in at least one of the air streams can be altered.

2. The enthalpy pump according to claim 1 and further comprising a pump fluidly connected to the conduit for circulating the liquid desiccant from a reservoir to the transfer portion through the conduit to move the liquid desiccant in and out of the first and second air streams.

3. The enthalpy pump according to claim 1, wherein the conduit includes a first coil to be positioned within the first air stream, a second coil to be positioned in the second air stream, and each coil comprises multiple fluidly connected transfer portions.

4. The enthalpy pump according to claim 3, wherein the multiple transfer portions are arranged in a column.

5. The enthalpy pump according to claim 4, and further comprising a third conduit adapted to fluidly connect the first air stream to a first process air stream and a fourth conduit adapted to fluidly connect the second air stream to a second process air stream, whereby the conditioned air passing over the first and second conduits is will be fluidly connected to the first and second process air streams to maintain the liquid desiccant remote of the first and second process air streams.

6. The enthalpy pump according to claim 5, and further comprising a blower fluidly connected to one of the third and fourth conduits to circulate air through the third and fourth conduits and across the first and second conduits.

7. The enthalpy pump according to claim 1, wherein the transfer portion is tubular.

8. The enthalpy pump according to claim 1, further comprising means to alter the temperature of at least one of the air streams.

9. An enthalpy pump for altering the humidity level of an air stream, the pump comprising:

a container having a transfer portion to be disposed in a first air stream, and adapted to hold a liquid desiccant;

the transfer portion being permeable to water vapor and impermeable to the liquid desiccant so as to retain liquid desiccant within the container while permitting exposure of the liquid desiccant to the first air stream; and the transfer portion further being adapted to move the liquid desiccant into and out of the first air stream, and a support for moving the container in and out of the first air stream whereby humidity in the first air stream can be altered.

10. The enthalpy pump according to claim 9 wherein the support comprises a rotatable wheel on which the container is mounted, one portion of the wheel to be disposed in the first air stream and another portion of the wheel to be disposed out of the first air stream, wherein rotation of the wheel can moves portions of the wheel alternately into and out of the first air stream.

11. The enthalpy pump according to claim 10 wherein the container comprises multiple blade-shaped containers each having one end located near the center of the wheel and an opposing end located near the periphery of the wheel.

12. The enthalpy pump according to claim 11 wherein the multiple blade-shaped containers form spokes for the wheel.

13. The enthalpy pump according to claim 9, further comprising means to alter the temperature of the first air stream.

14. An enthalpy pump for altering the humidity level of an air stream, the pump comprising:

a container having a transfer portion to be disposed in a first air stream, and holding a liquid desiccant;

the transfer portion being permeable to water vapor and impermeable to liquid desiccant so as to retain the liquid desiccant within the container while permitting exposure of the liquid desiccant to the first air stream; and said transfer portion further being adapted to move liquid desiccant into and out of the fist air stream, wherein the container comprises a reservoir for storing a liquid desiccant and the transfer portion comprises a conduit adapted to extend into the first air stream whereby humidity in the first air stream can be altered.

15. The enthalpy pump according to claim 14, wherein the container has more than one transfer portion.

16. The enthalpy pump according to claim 14, wherein the container is a coil comprising multiple fluidly connected conduits with transfer portions.

17. The enthalpy pump according to claim 16, wherein the multiple conduits are arranged in a column.

18. The enthalpy pump according to claim 17, wherein there are two conduits with one of the conduits adapted to extend into a first air stream and the other conduit adapted to extend into a second air stream.

19. The enthalpy pump according to claim 18, and further comprising a third conduit adapted to fluidly connect the first air stream to a first process air stream and a fourth conduit adapted to fluidly connect the second air stream to a second process air stream, whereby the conditioned air passing over the first and second conduits is can be fluidly connected to the first and second process air streams to maintain the liquid desiccant remote of the first and second process air streams.

20. The enthalpy pump according to claim 19, and further comprising a blower fluidly connected to one of the third and fourth conduits to circulate air through the third and fourth conduits and across the first and second conduits.

21. The enthalpy pump according to claim 14, and further comprising a water supply fluidly connected thereto for adding water to the liquid desiccant and increasing the concentration of water in the liquid desiccant.

22. The enthalpy pump according to claim 21, wherein the water supply is fluidly connected to the reservoir to add the water to the reservoir to increase the concentration of water in the liquid desiccant.

23. The enthalpy pump according to claims 21 wherein the water supply comprises a fluid sensor to monitor the level of the liquid desiccant and control the addition of water from the water source to the reservoir in response to the level of the liquid desiccant.

24. The enthalpy pump according to claim 23, wherein the fluid sensor is a float valve positioned with the reservoir to monitor the level of the liquid desiccant within the reservoir.

25. The enthalpy pump according to claims 14 and further comprising a water extractor for removing water from the liquid desiccant.

26. The enthalpy pump according to claim 25, wherein the water extractor is fluidly connected to the reservoir.

27. The enthalpy pump according to claim 26, wherein the water extractor is one of a centrifuge, sieve, an osmosis filter, and pressure chamber.

28. The enthalpy pump according to claim 14, further comprising means to alter the temperature of the first air stream.

29. An enthalpy pump for altering the humidity level of an air stream, the pump comprising:

a container having a transfer portion to be disposed in a first air stream, and holding a liquid desiccant;

the transfer portion being permeable to water vapor and impermeable to liquid desiccant so as to retain the liquid desiccant within the container while permitting exposure of the liquid desiccant to the first air stream, wherein the transfer portion has openings sized between approximately 3 angstroms and 500 angstroms; and said transfer portion further being adapted to move the liquid desiccant into and out of the first air stream whereby humidity in the first air stream can be altered.

30. The enthalpy pump according to claim 29, wherein the openings are less than approximately 500 angstroms.

31. An enthalpy pump for altering the humidity level of an air stream, the pump comprising:

a container having a transfer portion to be disposed in a first air stream, and holding a liquid desiccant;

the transfer portion being permeable to water vapor and impermeable to liquid desiccant so as to retain the liquid desiccant within the container while permitting exposure of the liquid desiccant to the first air stream, wherein the transfer portion of the conduit is made from one of PTFE, HDPE, PBA, PEN, and sintered plastics; and the transfer portion further being adapted to move the liquid desiccant into and out of the first air stream whereby humidity in the first air stream can be altered.

32. The enthalpy pump according to claim 31, wherein the transfer portion is made from spun bond HDPE.

33. The enthalpy pump according to claim 31, further comprising means to alter the temperature of the first air stream.

34. The enthalpy pump according to claim 36, further comprising means to alter the temperature of the first air stream.

35. The enthalpy pump according to claim 29, further comprising means to alter the temperature of the first air stream.

36. An enthalpy pump for altering the humidity level of an air stream, the pump comprising:

a container having a transfer portion to be disposed in a first air stream, and holding a liquid desiccant;

the transfer portion being permeable to water vapor and impermeable to liquid desiccant so as to retain the liquid desiccant within the container while permitting exposure of the liquid desiccant to the first air stream, wherein the transfer portion is a panel with a peripheral edge; and the transfer portion further being adapted to move the liquid desiccant into and out of the first air stream whereby humidity in the first air stream can be altered.

37. The enthalpy pump according to claim 36, wherein the panel edge is oriented against the first air stream.

* * * * *

UNITED STATES PATENT AND TRADEMARK OFFICE
CERTIFICATE OF CORRECTION

PATENT NO. : 6,684,649 B1
DATED : February 3, 2004
INVENTOR(S) : David A. Thompson It is certified that error appears in the above-identified patent and that said Letters Patent is hereby corrected as shown below:

Title page,
Item [56], References Cited, U.S. PATENT DOCUMENTS, delete
"5,908,799 to Kobayashi et al. dated 6/1999"
add -- 4,723,417 to Meckler dated 02/1988
   4,900,448 to Deetz et al. dated 02/1990 --
FOREIGN PATENT DOCUMENTS,
delete "EP 0 992 470 dated 4/2000"
add -- EP 0 678 321 dated 10/1995 --
OTHER PUBLICATIONS, delete "Patent Abstracts of Japan, JP 9-048668 dated February 18, 1997"
add -- Patent Abstracts of Japan, JP 7-008744 dated January 13, 1995
Patent Abstracts of Japan, JP 2-140535 dated May 30, 1990
Patent Abstracts of Japan, JP 5-146627 dated June 15, 1993
Patent Abstracts of Japan, JP 11-051421 dated Februry 26, 1999 --

Column 11,
Line 57, "wheel can moves portions" should read -- wheel can move portions --

Column 12,
Line 11, "fist air stream" should read -- first air stream --

Signed and Sealed this

Twenty-eighth Day of September, 2004

JON W. DUDAS
*Director of the United States Patent and Trademark Office*